US 12,195,129 B2

(12) United States Patent
Song (10) Patent No.: US 12,195,129 B2
(45) Date of Patent: Jan. 14, 2025

(54) MOBILITY OBJECT WITH A MOBILE DEVICE HOLDER

(71) Applicants: HYUNDAI MOTOR COMPANY, Seoul (KR); KIA MOTORS CORPORATION, Seoul (KR)

(72) Inventor: Hyun Song, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 850 days.

(21) Appl. No.: 17/191,020

(22) Filed: Mar. 3, 2021

(65) Prior Publication Data

US 2022/0063748 A1    Mar. 3, 2022

(30) Foreign Application Priority Data

Sep. 3, 2020   (KR) ........................ 10-2020-0112336

(51) Int. Cl.
*B60R 11/02*    (2006.01)
*B62J 45/10*    (2020.01)
*B60R 11/00*    (2006.01)

(52) U.S. Cl.
CPC .............. *B62J 45/10* (2020.02); *B60R 11/02* (2013.01); *B60R 11/0241* (2013.01);
(Continued)

(58) Field of Classification Search
CPC ......... B60R 11/0241; B60R 2011/0059; B60R 2011/0071; B60R 2011/0078; B60R 11/00; B60R 11/0235; B62H 5/001; B62H 5/003; B62J 6/03; B62J 7/08; B62J 11/00; B62J 11/04; B62J 43/23; B62J 43/30;
(Continued)

(56) References Cited

U.S. PATENT DOCUMENTS 5,114,060 A     5/1992   Boyer
10,789,790 B1 *  9/2020   Vandenbussche ....... B62J 50/22
(Continued)

FOREIGN PATENT DOCUMENTS

CN    106184029 A    12/2016
CN    108638974 A    10/2018
(Continued)

OTHER PUBLICATIONS

Office Action cited in U.S. Appl. No. 17/182,970; Mar. 24, 2023.
Office Action cited in U.S. Appl. No. 17/182,970; Aug. 5, 2022.
Office Action cited in U.S. Appl. No. 17/182,970; Dec. 7, 2022.

*Primary Examiner* — Anne M Boehler
*Assistant Examiner* — Felicia L. Brittman-Alabi
(74) *Attorney, Agent, or Firm* — Lempia Summerfield Katz LLC (57) ABSTRACT

A mobile device holder for mobility object includes: a main body coupled to a top end of the mobility object; a display positioned on a top surface of the main body and configured to provide a passenger of the mobility object with information; and a holder configured to be stored in the main body when coupled to a first side of the main body, and configured to be coupled to a second side of the main body and mount a mobile device thereon when separated from the first side, wherein the mobile device is supported together on the holder and a top surface of the display when mounted.

11 Claims, 5 Drawing Sheets

(52) U.S. Cl.
CPC ............... *B60R 2011/0059* (2013.01); *B60R 2011/0071* (2013.01); *B60R 2011/0078* (2013.01); *B62K 2204/00* (2013.01)

(58) Field of Classification Search
CPC .......... B62J 45/10; B62J 50/22; B62J 50/225; B62K 3/002; B62K 2204/00; F16M 13/02; G07C 9/00896
USPC ..................................................... 280/288.4
See application file for complete search history.

(56) References Cited

U.S. PATENT DOCUMENTS

| | | |
|---|---|---|
| 2006/0169861 A1 | 8/2006 | Williams et al. |
| 2014/0125876 A1* | 5/2014 | Nakayama ............. B60K 37/02 348/837 |
| 2019/0291804 A1 | 9/2019 | Yu et al. |
| 2020/0024867 A1* | 1/2020 | Lee ................... G07C 9/00309 |

FOREIGN PATENT DOCUMENTS

| | | |
|---|---|---|
| CN | 110380483 A | 10/2019 |
| KR | 10-1625648 | 5/2016 |
| KR | 20160100085 A | 8/2016 |

* cited by examiner

MOBILITY OBJECT WITH A MOBILE DEVICE HOLDER

CROSS REFERENCE TO RELATED APPLICATION

The present application claims priority to and the benefit of Korean Patent Application No. 10-2020-0112336, filed on Sep. 3, 2020, the entire contents of which are incorporated herein by reference.

FIELD

The present disclosure relates to a mobile device holder for mobility object.

BACKGROUND

The statements in this section merely provide background information related to the present disclosure and may not constitute prior art.

A micro-mobility object such as an electric kickboard has been commercialized and has been popular in recent years. A development of a holder capable of mounting a mobile device in using the micro-mobility object is desired. However, a mobile device holder for the micro-mobility object has a small overall size unlike a conventional mobile device holder used for mobility object such as a vehicle or a bicycle. Therefore, the mobile device holder for the micro-mobility object may be sensitive to vibration or impact, and it may be desired to find a position where the mobile device holder can be mounted without spoiling the appearance of the mobility object. In addition, we have discovered that when a passenger places both hands on a steering wheel when boarding the micro-mobility object, the passenger may not be able to use an additional device other than the mobile device.

The contents described as the related art have been provided only to assist in understanding the background of the present disclosure and should not be considered as corresponding to the related art known to those having ordinary skill in the art.

SUMMARY

The present disclosure provides a mobile device holder for mobility object, which may be coupled to the top end of the micro-mobility object, mount a mobile device thereon by allowing a holder of the mobile device holder, which is stored in one side of its main body, to be separated from the one side after the mobile device is authenticated and then to be coupled to the opposite side of the main body. When the holder is stored in the body, the mobile device holder may allow an additional device to be used by being coupled thereto when the holder is stored in the main body.

According to one form of the present disclosure, a mobile device holder for mobility object includes: a main body coupled to the top end of the mobility object; a display positioned on a top surface of the main body and configured to provide a passenger of the mobility object with information; and a holder configured to be stored in the main body when coupled to one side of the main body, and configured to be coupled to the opposite side of the main body and mount a mobile device thereon when separated from the one side, wherein the mobile device is supported together on the holder and the top surface of the display when mounted.

A coupling portion may be positioned in the front surface of the main body and a protruding portion may be positioned at one end of the holder, and the holder and the main body may be coupled to each other by separating the holder from the main body and then inserting the protruding portion into the coupling portion.

The protruding portion may be inserted into the coupling portion, extend toward the front of the mobility object, and be configured to allow the holder to be spaced apart from the main body.

The protruding portion may inserted into the couple portion and be bent toward the top of the mobility object, and a mounting angle of the mobile device may be adjusted based on an angle of the holder.

The coupling portion may be coupled to an additional device when the holder is stored in the main body to allow the additional device to be positioned on the front surface of the main body.

A fixing portion may be positioned on the first side of the main body, the main body may authenticate a user terminal through communication with a designated user terminal, and the fixing portion may lock or unlock the holder to the main body based on a result of the authentication.

The holder may have an inner surface on which the mobile device is mounted, and opposite ends bent toward the inner surface and configured to wrap opposite sides of the mobile device when the mobile device is mounted thereon.

A non-slip portion may be formed in a portion of the main body or of the holder at which is in contact with the mobile device.

The main body may have a battery built therein, and when the mobile device is mounted on the main body, the mobile device may be charged through the battery of the main body, and the main body may be separated from the mobility object to charge its battery.

A transport portion may be positioned on one side of the main body, and the transport portion may be accommodated in the main body or be deployed from the main body to carry luggage.

The mobility object may be a kickboard, and the main body may be positioned at the top end of the kickboard.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
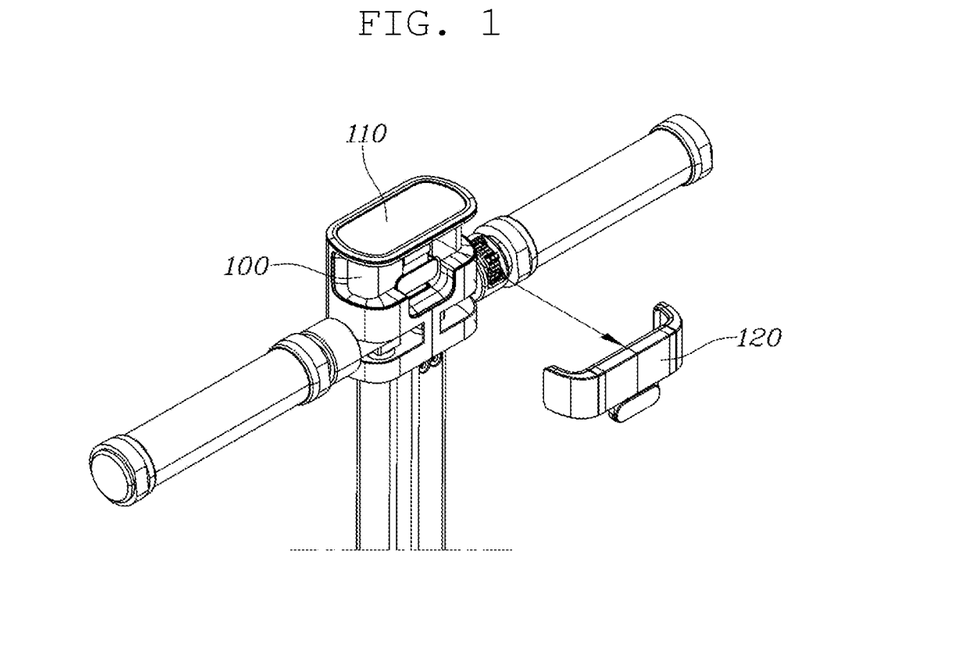
FIG. 1 is a view showing that a holder, which used to be stored in a main body of a mobile device holder for mobility object according to one form of the present disclosure, is separated from the main body.
Figure 2:
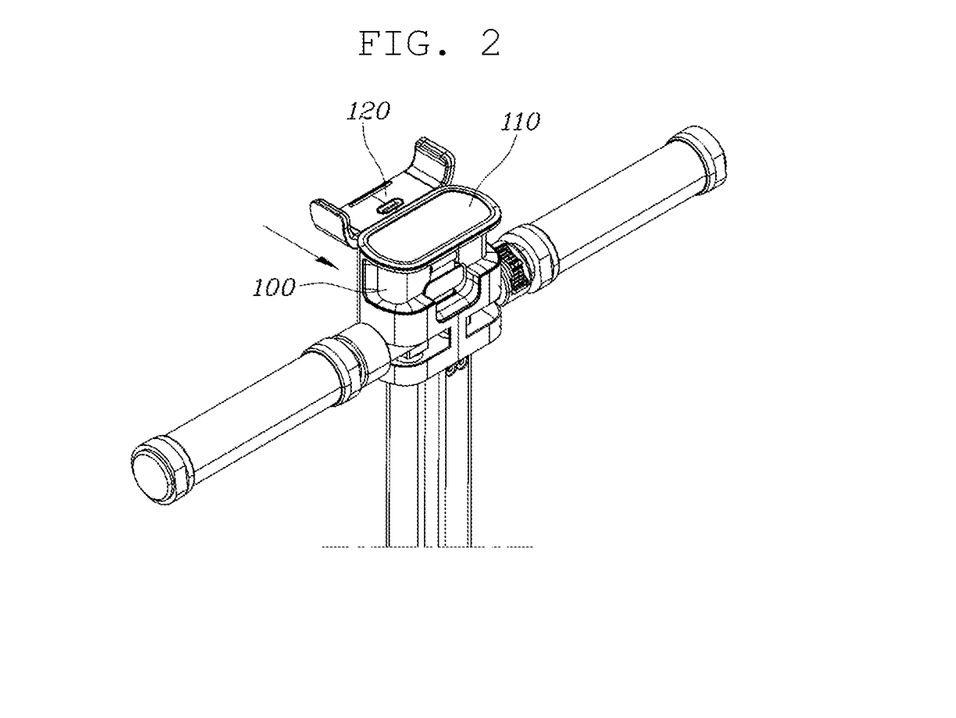
FIG. 2 is a view showing a state in which the holder, which used to be stored in the main body of a mobile device holder for mobility object according to one form of the present disclosure, may mount a mobile device thereon by being separated from the main body and then coupled to the front surface of the main body.
Figure 3:
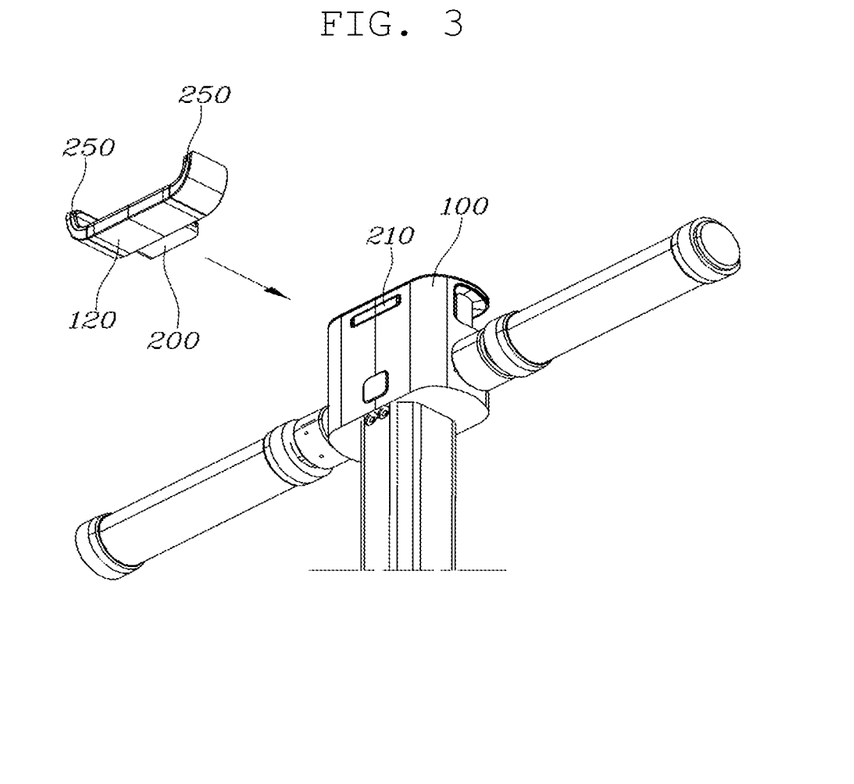
FIG. 3 is a view showing that the holder of a mobile device holder for mobility object according to one form of the present disclosure is inserted into a coupling portion positioned in the front surface of the main body.
Figure 4:
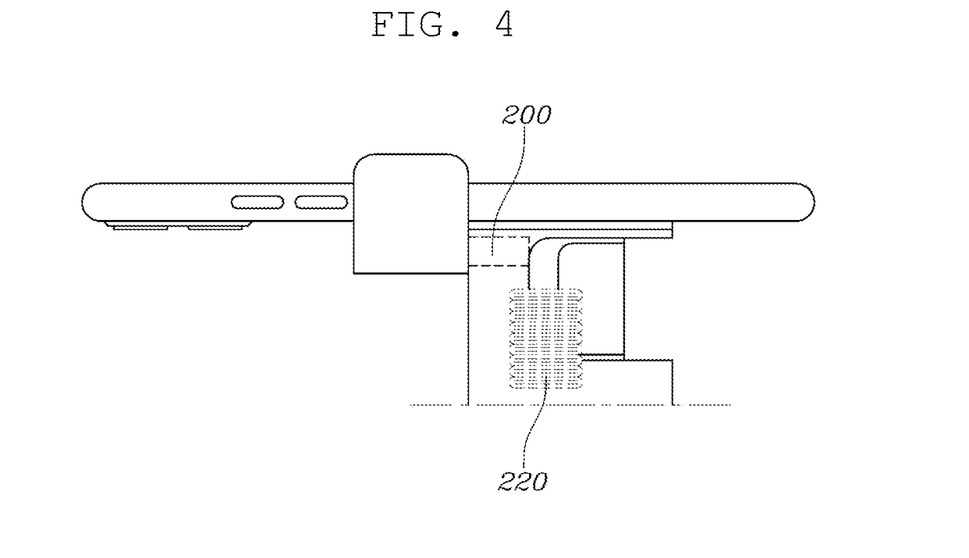
FIG. 4 is a side view showing a state in which the holder of a mobile device holder for mobility object according to one form of the present disclosure mounts a mobile device thereon by being coupled to the front surface of the main body.
Figure 5:
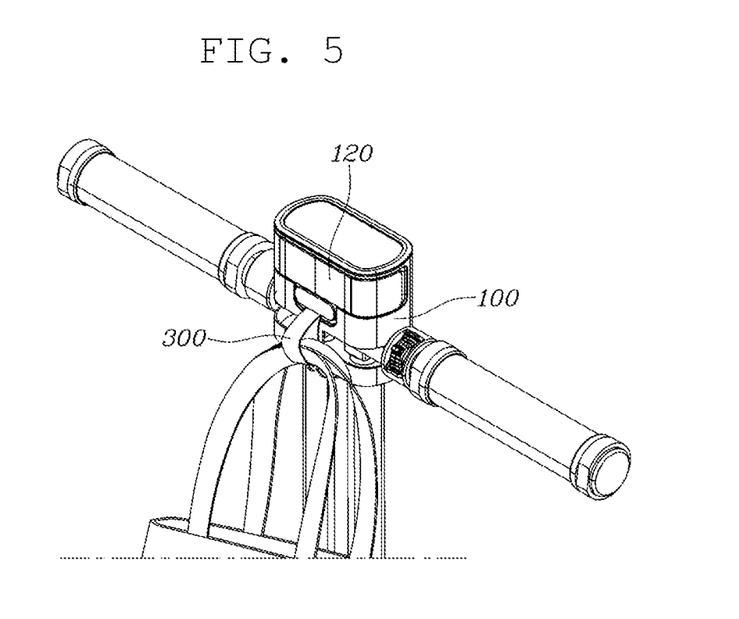
FIG. 5 is a view showing that a mobile device holder for mobility object according to one form of the present disclosure carries luggage using its transport portion.
Figure 6:
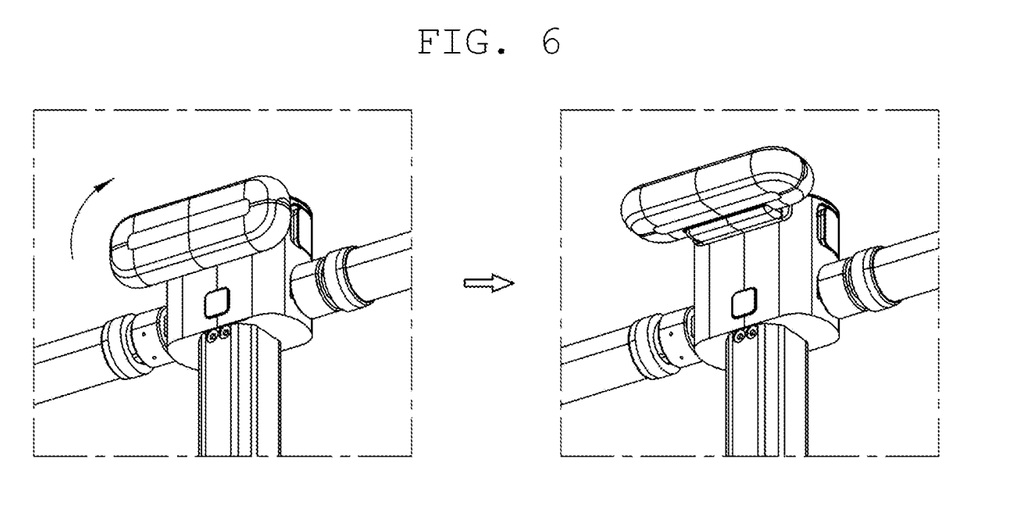
FIG. 6 is a view showing that a light module is used by being coupled to the front surface of the main body of a mobile device holder for mobility object according to one form of the present disclosure.
Figure 7:
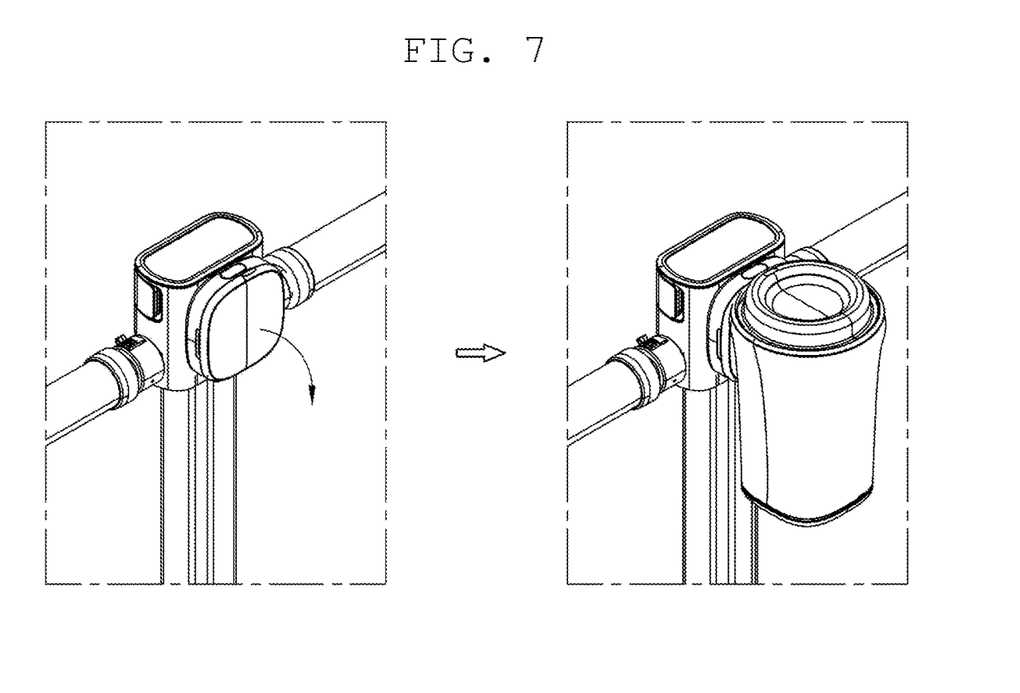
FIG. 7 is a view showing that a multi-pocket module is used by being coupled to the front surface of the main body of a mobile device holder for mobility object according to one form of the present disclosure.
Figure 8:
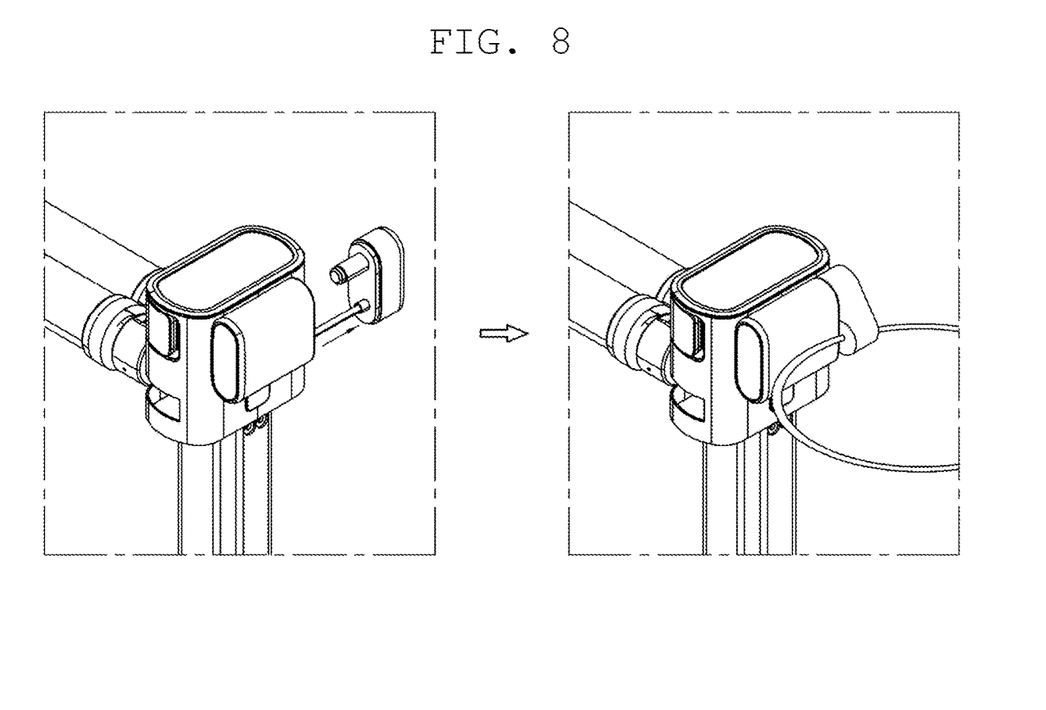
FIG. 8 is a view showing that a locking module is used by being coupled to the front surface of the main body of a mobile device holder for mobility object according to one form of the present disclosure.
Figure 9:
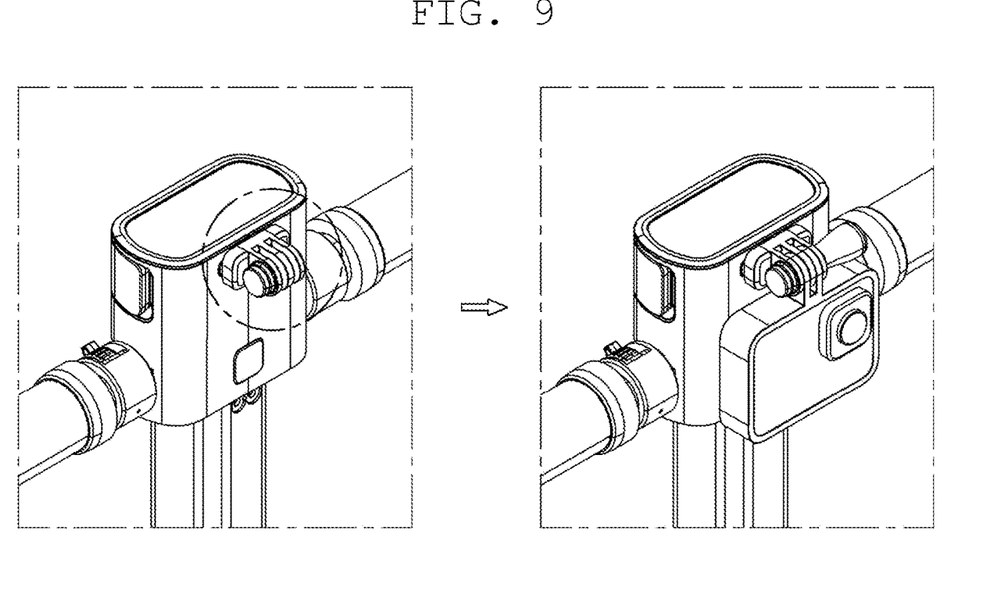
FIG. 9 is a view showing that a bridge module is coupled to the front surface of the main body of a mobile device holder for mobility object according to one form of the present disclosure and a black box is used by being coupled to the bridge module.

FIG. 1 is a view showing that a holder, which used to be stored in a main body of a mobile device holder for mobility object according to one form of the present disclosure, is separated from the main body. FIG. 2 is a view showing a state in which the holder, which used to be stored in the main body of a mobile device holder for mobility object according to one form of the present disclosure, may mount a mobile device thereon by being separated from the main body and then coupled to the front surface of the main body. FIG. 3 is a view showing that the holder of a mobile device holder for mobility object according to one form of the present disclosure is inserted into a coupling portion positioned in the front surface of the main body. FIG. 4 is a side view showing a state in which the holder of a mobile device holder for mobility object according to one form of the present disclosure mounts a mobile device thereon by being coupled to the front surface of the main body. FIG. 5 is a view showing that a mobile device holder for mobility object according to one form of the present disclosure carries luggage using its transport portion. FIG. 6 is a view showing that a light module is used by being coupled to the front surface of the main body of a mobile device holder for mobility object according to one form of the present disclosure. FIG. 7 is a view showing that a multi-pocket module is used by being coupled to the front surface of the main body of a mobile device holder for mobility object according to one form of the present disclosure. FIG. 8 is a view showing that a locking module is used by being coupled to the front surface of the main body of a mobile device holder for mobility object according to one form of the present disclosure. FIG. 9 is a view showing that a bridge module is coupled to the front surface of the main body of a mobile device holder for mobility object according to one form of the present disclosure and a black box is used by being coupled to the bridge module.

FIG. 1 is a view showing that a holder, which used to be stored in a main body of a mobile device holder for mobility object, is separated from the main body. FIG. 2 is a view showing a state in which the holder, which used to be stored in the main body of a mobile device holder for mobility object, may mount a mobile device thereon by being separated from the main body and then coupled to the front surface of the main body. A mobile device holder for mobility object according to one form of the present disclosure includes: a main body 100 coupled to the top end of the mobility object and having a display 110 positioned on its top surface to provide a passenger of the mobility object with information; and a holder 120 coupled to one side of the main body 100 to be stored in the main body 100, and coupled to the opposite side of the main body 100 to mount a mobile device thereon when separated from the one side, wherein the mobile device may be supported together on the holder 120 and the top surface of the display 110 when mounted.

Here, the mobility object may refer to a small mobility object mean, i.e. micro-mobility object such as an electric kickboard, an electric scooter, a hoverboard and an electric wheel. In the mobile device holder for mobility object according to one form of the present disclosure, the mobility object may be a kickboard, and the main body 100 may be positioned at the top end of the kickboard. In general, the kickboard may have wheels at its front and rear, a footrest positioned between the wheels, a post positioned on the front wheel, and a handle positioned at the top end of the post. Based on this basic kickboard structure, the mobile device holder for mobility object according to one form of the present disclosure may have the main body 100 at the center of the handle positioned on the top end of the kickboard for the passenger to easily view the display or the mobile device when operating the kickboard.

In detail, the mobile device holder for mobility object according to one form of the present disclosure may have the main body 100 positioned at the center of the handle of the top end of the mobility object and a display 110 positioned on the top surface of the main body 100. The display 110 may display a state of the kickboard such as its speed and travel distance, and the passenger may thus simply receive its information. The holder 120 may be positioned on one side of the main body 100. The holder 120 may be stored in the one side of the main body 100, and when the mobile device needs to be mounted thereon, the holder 120 may be separated from the main body 100, then change its direction, and be coupled to the front surface of the main body 100 to form a support surface. Then, the mobile device may be supported together on the support surface formed by the holder 120 and the top surface of the display 110. Therefore, the area of the support surface may become large, and the mobile device may thus be more stably mounted on the holder.

That is, the top surface of the display 110 as well as the support surface formed by the holder 120 may be used as the support surfaces of the mobile device. Accordingly, the mobile device may be more stably mounted and may be inhibited from being easily separated from the mobility object due to vibration or impact. However, in case that the top surface of the display 110 is used as the surface on which the mobile device is mounted, the mobile device may cover a screen of the display 110. The passenger may be provided with more diverse and accurate information through the mobile device than through the display 110, and the coverage of the screen of the display 110 may thus be compensated for by the mounted mobile device.

Therefore, it may be preferable for the passenger to receive information such as a route and a traffic condition through the mobile device rather than the display 110 when traveling an unfamiliar or complicated route. When traveling a familiar route or wanting to receive only the information on the state of the kickboard, the passenger may be provided with the information through the display 110 without having to mount the mobile device.

Meanwhile, in the mobile device holder for mobility object according to one form of the present disclosure, the main body 100 may have a battery built therein, and when the mobile device is mounted on the main body 100, the mobile device may be charged through the battery of the main body 100, and the main body 100 may be separated from the mobility object to charge its battery. That is, the main body 100 may serve as an auxiliary battery, and when the mobile device is mounted on the main body 100, the mobile device may be charged by wire or wirelessly to maintain its power.

FIG. 3 is a view showing that the holder of a mobile device holder for mobility object according to one form of the present disclosure is inserted into a coupling portion positioned in the front surface of the main body. In the mobile device holder for mobility object according to one form of the present disclosure, a coupling portion 210 may be positioned in the front surface of the main body 100 and a protruding portion 200 may be positioned at one end of the holder 120, and the holder 120 and the main body 100 may be coupled to each other by allowing the holder 120 to be separated from the main body 100 and then allowing the protruding portion 200 to be inserted into the coupling portion 210.

In detail, the coupling portion 210 of the main body 100 may be covered with a cover, and the cover may be folded inward when the protruding portion 200 of the holder 120 is inserted into the coupling portion 210. When the protruding portion 200 is inserted into the coupling portion 210, the supporting surface of the holder 120 may be formed in front of the main body 100, and the mobile device may be mounted on the supporting surface of the holder 120.

Meanwhile, in the mobile device holder for mobility object according to one form of the present disclosure, the holder 120 may have an inner surface on which the mobile device is mounted and its opposite ends 250 respectively bent toward the inner surface to wrap opposite sides of the mobile device when the mobile device is mounted thereon. The opposite ends 250 of the holder 120 may each have a width adjusted to the size of the mobile device and wrap the opposite sides of the mobile device, thereby inhibiting the mobile device from being separated from the holder when the mobile device is mounted on the mobility object, and making it possible to more stably mount the mobile device on the holder.

In addition, in the mobile device holder for mobility object according to one form of the present disclosure, a non-slip portion may be formed in a portion of the main body 100 or holder 120, which is in contact with the mobile device. The non-slip portion may be positioned on a portion of the holder 120 that is in contact with the mobile device, the support surface of the holder 120 supporting the mobile device or the top surface of the display 110 of the main body 100 supporting the mobile device. Accordingly, the mobile device may be inhibited from being separated from the holder by reinforcing fixing force for mounting the mobile device on the holder.

Meanwhile, in the mobile device holder for mobility object according to one form of the present disclosure, the protruding portion 200 may extend toward the front of the mobility object in a state of being inserted into the coupling portion 210 to allow the holder 120 to be spaced apart from the main body 100. Through this structure, a distance between the two support surfaces supporting the mobile device based on the length of the mobile device may be increased, and support the opposite ends of the mobile device in a length direction, thereby more stably mounting the mobile device on the holder.

In addition, in the mobile device holder for mobility object according to one form of the present disclosure, the protruding portion 200 may be bent toward the top of the mobility object in a state of being inserted into the coupling portion 210, and a mounting angle of the mobile device may be adjusted based on an angle of the holder 120. In detail, the angle of the support surface formed by the holder 120 may be changed as the protruding portion 200 is bent. Accordingly, when the mobile device is mounted, the mounting angle of the mobile device may be changed. Through this structure, when using the mobility object, the passenger may mount the mobile device on the holder at an optimized angle or change its mounting angle, based on the external environment such as the passenger's physical condition, eye level, and sunlight reflection.

FIG. 4 is a side view showing a state in which the holder of a mobile device holder for mobility object according to one form of the present disclosure mounts a mobile device thereon by being coupled to the front surface of the main body. In the mobile device holder for mobility object according to one form of the present disclosure, a fixing portion 220 may be positioned on one side of the main body 100, the main body 100 may authenticate a user terminal through communication with a designated user terminal, and the fixing portion 220 may lock or unlock the holder 120 to the main body 100 based on a result of the authentication.

In the mobile device holder for mobility object according to one form of the present disclosure, the holder 120 may be stolen due to a structure in which the holder 120 may be separated from the main body 100. In addition, the micromobility object has a small size, and the mobility object itself may thus be stolen. The mobility object may be allowed to be operated through the passenger authentication, and thus the mobility object as well as the holder 120 may be inhibited from being stolen.

In detail, the fixing portion 220 may be made of an electromagnet or the like, and the protruding portion 200 of the holder 120 may be made of a metal or a magnet, and the holder 120 may thus be locked to the main body 100 by fixing the protruding portion 200 to the main body 100 using magnetic force. Accordingly, when the holder 120 is stored in the main body 100 or the holder 120 is coupled to the front surface of the main body, the main body 100 may unlock the holder 120 therefrom by controlling the fixing portion 220 only when the user terminal is authenticated through the communication with the designated user terminal, and when the terminal is not the designated user terminal, the holder 120 may be locked to the main body 100 and thus be inhibited from being stolen. In addition, the main body 100 may block the operation of the display 110 or mobility object when the terminal is not the designated user terminal after performing the user authentication. Furthermore, it may also be possible to inhibit the mobility object from being stolen by triggering an emergency alert or the like.

FIG. 5 is a view showing that a mobile device holder for mobility object according to one form of the present disclosure carries luggage using its transport portion. In the mobile device holder for mobility object according to one form of the present disclosure, a transport portion 300 may be positioned on one side of the main body 100, and the transport portion 300 may be accommodated in the main body 100 or deployed from the main body 100 to carry luggage.

In detail, when not in use, the transport portion 300 may be accommodated in an inner portion of the main body 100, in which the holder 120 is stored. When transporting an object, the passenger may elongate the transport portion 300 to form a ring, and fix the object to the ring. The transport portion 300 may fix the object or luggage of various sizes to the ring due to its structure in which the ring may extend. When not in use, the transport portion 300 may be accommodated inside the main body 100, and thus it may not interfere with the operation of the mobility object or spoil its appearance. Accordingly, when using micro-mobility object such as the kickboard, the passenger may not have to directly lift the object to be transported and may safely use the micro-mobility object with his/her both hands after fixing the object to the mobility object.

FIG. 6 is a view showing that a light module is used by being coupled to the front surface of the main body of a mobile device holder for mobility object according to one form of the present disclosure. FIG. 7 is a view showing that a multi-pocket module is used by being coupled to the front surface of the main body of a mobile device holder for mobility object according to one form of the present disclosure. FIG. 8 is a view showing that a locking module is used by being coupled to the front surface of the main body of a mobile device holder for mobility object according to one form of the present disclosure. FIG. 9 is a view showing that a bridge module is coupled to the front surface of the main body of a mobile device holder for mobility object according to one form of the present disclosure and a black box is used by being coupled to the bridge module.

In the mobile device holder for mobility object according to one form of the present disclosure, the coupling portion 210 may be coupled to an additional device in a state in which the holder 120 is stored in the main body 100 to allow the additional device to be positioned on the front surface of the main body 100. The additional device is a device desired when using the mobility object and may be a light, a lock, a cup holder, a black box or the like, and may be easily used by being coupled to the coupling portion 210 of the front surface of the main body 100.

In detail, referring to FIG. 6, the light module may be coupled to the coupling portion 210 positioned in the front surface of the main body 100, and thus when using the mobility object at night, the passenger may safely drive the mobility object by unfolding the light module toward the front surface or adjusting its angle, during its use.

In addition, referring to FIG. 7, the multi-pocket module may be coupled to the coupling portion 210 positioned in the front surface of the main body 100, and the passenger may thus use the multi-pocket module as a cup holder by unfolding the pocket downward, or drive the mobility object while holding other belongings.

Meanwhile, referring to FIG. 8, the locking module may be coupled to the coupling portion 210 positioned in the front surface of the main body 100, and the mobility object may thus be inhibited from being stolen by locking a lock included in the locking module to an external structure when the mobility object is stored or mounted for a while after its driving is over.

In addition, referring to FIG. 9, the bridge module may be coupled to the coupling portion 210 positioned in the front surface of the main body 100, and a camera device such as an action cam or a black box may thus be mounted on the front surface of the main body 100 through the bridge module. The mounted camera device may take a driving image or use an image of an accident situation in an emergency.

In particular, when the mobility object is a kickboard, the passenger may not be able to use the additional device because his/her both hands are always placed on the steering wheel. Through this coupling portion 210, any desired additional device other than the mobile device holder may be used by easily coupling the device to the main body 100 of the mobility object.

According to the mobile device holder for mobility object of the present disclosure, the holder may be coupled to the top end of the micro-mobility object, mount a mobile device thereon by allowing a holder of the mobile device holder, which is stored in one side of its main body, to be separated from the one side after the mobile device is authenticated and then coupled to the opposite side of the main body, and allow an additional device to be used by being coupled thereto when the holder is stored in the main body.

Although the present disclosure has been shown and described with respect to specific embodiments, it is apparent to those having ordinary skill in the art that the present disclosure may be variously modified and altered without departing from the spirit and scope of the present disclosure as defined by the following claims.

What is claimed is:

1. A mobility object with a mobile device holder, wherein the mobile device holder comprises:
    a main body coupled to a top end of the mobility object;
    a display positioned on a top surface of the main body and configured to provide a passenger of the mobility object with information; and
    a holder configured to be inserted into the main body when coupled to a first side of the main body, and configured to be detachably coupled to a second side of the main body, wherein the second side of the main body faces the first side of the main body and the display is disposed between the first side and the second side of the main body,
    wherein the holder is configured to mount a mobile device on a top surface of the display when separated from the first side of the main body and coupled to the second side of the main body,
    wherein when mounted, the mobile device is supported along the holder and the top surface of the display and configured to be detachably coupled to the holder.

2. The mobility object of claim 1, wherein a coupling portion is positioned in a front surface of the main body,
    a protruding portion is positioned at a first end of the holder, and
    the holder and the main body are coupled to each other by inserting the protruding portion of the holder into the coupling portion of the main body.

3. The mobility object of claim 2, wherein the protruding portion is inserted into the coupling portion, extends toward a front of the mobility object, and is configured to allow the holder to be spaced apart from the main body.

4. The mobility object of claim 2, wherein the protruding portion is inserted into the coupling portion and is bent toward a top of the mobility object, and a mounting angle of the mobile device is adjusted based on an angle of the holder.

5. The mobility object of claim 2, wherein the coupling portion is coupled to an additional device when the holder is stored in the main body.

6. The mobility object of claim 1, wherein a fixing portion is positioned on the first side of the main body,
   the main body authenticates a user terminal through communication with a designated user terminal, and
   the fixing portion locks or unlocks the holder to the main body based on a result of the authentication.

7. The mobility object of claim 1, wherein the holder has an inner surface on which the mobile device is mounted and opposite ends that are configured to bend toward the inner surface and wrap opposite sides of the mobile device when the mobile device is mounted thereon.

8. The mobility object of claim 1, wherein a non-slip portion is formed in a portion of the main body or of the holder which is in contact with the mobile device.

9. The mobility object of claim 1, wherein the main body has a battery built therein and is configured to be separated from the mobility object, and
   when the mobile device is mounted on the main body, the mobile device is charged through the battery of the main body.

10. The mobility object of claim 1, wherein a transport portion is positioned on the first side of the main body and is configured to be accommodated in the main body or be deployed from the main body.

11. The mobility object of claim 1, wherein the mobility object is a scooter, and the main body is positioned at a top end of the scooter.

* * * * *